US006972917B2

(12) United States Patent
Maeda et al.

(10) Patent No.: US 6,972,917 B2
(45) Date of Patent: Dec. 6, 2005

(54) SIGNAL PROCESSING TECHNIQUE FOR PREVENTING DELAY IN READ TIME FROM RETRY OPERATIONS

(75) Inventors: Hideaki Maeda, Odawara (JP); Yoshiju Watanabe, Ninomiya (JP); Naoki Satoh, Odawara (JP); Yasuyuki Ito, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 580 days.

(21) Appl. No.: 10/079,997

(22) Filed: Feb. 19, 2002

(65) Prior Publication Data

US 2002/0135916 A1 Sep. 26, 2002

(30) Foreign Application Priority Data

Mar. 26, 2001 (JP) ............................ 2001-086636

(51) Int. Cl.[7] ................................................ G11B 5/09

(52) U.S. Cl. ....................................................... 360/51

(58) Field of Search ........................... 360/51, 53, 72.1

(56) References Cited

U.S. PATENT DOCUMENTS 6,005,739 A * 12/1999 Yun ........................ 360/77.04

FOREIGN PATENT DOCUMENTS

| | | |
|---|---|---|
| JP | 5-62367 | 3/1993 |
| JP | 8-315513 | 11/1996 |
| JP | 2001-67816 | 3/2001 |
| JP | 2001-67817 | 3/2001 |

* cited by examiner

*Primary Examiner*—David Hudspeth
*Assistant Examiner*—Mitchell Slavitt
(74) *Attorney, Agent, or Firm*—Townsend and Townsend and Crew LLP

(57) ABSTRACT

The present invention enables recovery of data reading, even when thermal asperities or defective media will make it impossible to increase the number of retries or to read the data, occur in the AGC/PLL part. In a device for writing and reading information, when an error occurs in the region of the recording media where the AGC/PLL signal is written, and if that information is written continuously to several sectors, then data reading is performed by using the AGC/PLL of the following sector, without performing a retry, or by performing a minimum number of retries.

12 Claims, 12 Drawing Sheets

SIGNAL PROCESSING TECHNIQUE FOR PREVENTING DELAY IN READ TIME FROM RETRY OPERATIONS

BACKGROUND OF THE INVENTION

1. Field of the Invention

The present invention relates to an information write/read device using a disk medium, for example, a signal processing method, signal processing circuit and information write/read device, suitable for a magnetic disk device.

2. Description of the Related Art

The prior art is described here with respect to a magnetic disk device.

FIG. 2 and FIG. 3 show the sector composition of a conventional magnetic disk device, and FIG. 4 shows the composition of the data reading section of the magnetic disk device.

The sector 10 illustrated in FIG. 2 comprises an AGC/PLL part 101 to which an AGC/PLL signal is written, a Sync field 102 to which a particular mark for guaranteeing data synchronization is written, a data part 103 to which information is written and an ECC part 104 (numeral 206 in FIG. 3). An AGC/PLL signal is a signal (having a cyclical bit pattern) which controls an AGC circuit that serves to adjust the output amplitude during reading to an approximately uniform amplitude, and a PLL circuit that serves to extract read clock signals. Moreover, parity bits for error correction are written to the ECC part.

The composition in FIG. 3 is a multi-sync composition, wherein the multi-sync sector 20 comprises a plurality of AGC/PLL parts 201, 203 and Sync fields 202, 204. Normally, the signal in Sync field 1 (202) is used to ensure data synchronization, but when the signal from Sync field 1 cannot be read out, data synchronization is ensured during data reading by using the signal from Sync field 2 (204).

In FIG. 4, the signal written to the recording media 11 is read out by an MR read head 12 and this signal is amplified by a pre-amp 13, whereupon the read out signal 1 is output to the read channel 14. The read channel 14 inputs the read out signal 1 to a VGA circuit 141, which controls the amplitude thereof. The output 151 of the VGA circuit is reshaped by an analog filter 142, and input to an AD converter 143, which outputs a digital signal 152. The PLL circuit 150 generates a read clock signal 153 required for sampling by the AD converter 143, on the basis of a clock signal from a synthesizer 149 and the AGC/PLL part 101 illustrated in FIG. 2 read from the digital signal 152. Moreover, the digital signal 152 is input to an equalizer 144 in order to equalize prescribed characteristics. The output signal 155 from the equalizer is input to an AGC circuit 147 and a maximum likelihood detector (ML) 145. The AGC circuit 147 outputs amplitude control information 154 for controlling the VGA circuit 141. The ML 145 demodulates the read signal to generate a demodulated signal 156. This demodulated signal 156 is input to a Sync detector 148 and decoder (DEC) 146. The Sync detector 148 extracts a data synchronization signal 157 from the Sync signal written in the Sync field 102 illustrated in FIG. 2. The decoder 146 regenerates a decoded signal 2 with the demodulated signal 156 and data synchronization signal 157, and inputs this to the Hard Disk Controller 16. The decoded signal 2 is input to an ECC circuit 161 in the Hard Disk Controller 16 where it is error corrected, and a data read signal 3 is output externally. In the foregoing example, the signal input to the AGC circuit 147 is taken as the equalizer output signal 155, but it may also be the digital signal 152 output by the AD converter 143.

The Hard Disk Controller 16 sends a read gate RG 31 to the read channel 14. This RG 31 is used to control the read channel 14. When the reading head reaches the target sector, the RG 31 is set to a read-enable state and the PLL signal or Sync signal written in the AGC/PLL part or Sync field at the start of the sector is detected, whereupon the data signal written to the data part is read out.

In a device of this kind, if an error occurs during signal read out, due to a defect, or thermal asperity (TA), which is a particular feature of MR (or GMR) read heads, or the like, then different countermeasures are taken, depending on the region in which the error originated. In there is an error in the data part or ECC part, then this can be corrected by the ECC circuit 161 in the Hard Disk Controller 16. If an error occurs in the Sync field, then the decoder 146 will decode the majority of the data signal in error, and the ECC circuit 161 will enter a state where it is not able to perform error correction. Therefore, the hard disk device will perform a re-read (retry) operation. Moreover, if there is an error in the AGC/PLL part, then it will become impossible to control the AGC circuit 147 and the PLL circuit 150 properly, due to the error. Therefore, it will be impossible to read the following data signal correctly. Furthermore, in order to reduce the effects of errors in the AGC/PLL part, a countermeasure has been sought by lengthening the AGC/PLL part and shifting the data extraction region upon retry. Since this requires lengthening of the AGC/PLL part, it has caused loss of formatting. In addition, an error countermeasure based on retry has also been sought by adopting a multi-sync composition as illustrated in FIG. 3, wherein a plurality of (usually, two) AGC/PLL signals and Sync signals are written, and the data mark is detectable by the second or later Sync signal.

Japanese Patent Laid-open No. H05-62367 relates to technology for providing retry-based countermeasures of this kind.

Japanese Patent Laid-open No. H05-62367 discloses, in relation to an optical disk device, technology whereby defect location information is written when a defect occurs, and when performing a retry, the control of the PLL circuit is substantially halted on the basis of this defect location information.

In the prior art, in addition to the increased number of retries and the loss of formatting described above, if there is a particularly large error in the AGC/PLL part, then it will not be possible to read the AGC/PLL part correctly, even if a retry is performed. Therefore, the Sync signal or data signal following the unreadable AGC/PLL signal cannot be reproduced, hence leading to data lost and degrading system reliability.

It is an object of the present invention to provide a signal processing method and signal processing circuit, and an information write/read device comprising such a circuit, which prevents delay in the read time due to retry operations, loss of formatting and data faults, as described above.

SUMMARY OF THE INVENTION

In order to achieve the aforementioned objects, the present invention has arrived at continuing the phase and frequency of the preceding sector, when reading sectors that have been written continuously.

In the present invention, when reading a continuously written signal, following sectors are read by using the head sector to ensure the output amplitude control and read clock signal. In a following sector, the AGC/PLL information obtained from the head sector is used, and AGC/PLL information is not generated for each sector. Therefore, even if an error caused by a defect, TA, or the like, occurs in the AGC/PLL part of a following sector, the data signal can still be read without performing a retry. If an error occurs in the AGC/PLL part of the head sector, then by implementing a retry, it is possible to generate phase information from the sector immediately preceding that sector and the sector following it, thereby enabling the data to be read.

Moreover, even when writing a file having a large size of a kind that is written continuously spanning several sectors, a write function is provided whereby the data is written to consecutive sectors, for each set of several sectors. In this case, if a defect occurs in a part of the continuously written sectors, and the sector of the portion of data written thereon is to be rewritten to an alternate region corresponding to the defect, then all of the continuously written data is rewritten to a region where it can be written continuously, and hence can be read continuously.

In the present invention, control is performed in such a manner that that the signal (Read Gate) indicating read permission during continuous reading does not assume a read-prohibited state between each sector. Moreover, the read control information (AGC/PLL control information) is shared between sectors. Furthermore, in a long sector format method, the read control information is not contained in the signal saved to the recording media. Consequently, if the Hard Disk Controller and read channel are constituted by physically separate integrated circuits, then the RG signal (for example, 31 in FIG. 5,) the AGC/PLL control signal output by the Hard Disk Controller (for example, 35 in FIG. 7), the signal on the recording media (41 in FIG. 9), and the like, will be communicated between the two circuits.

DESCRIPTION OF THE PREFERRED EMBODIMENTS

Below, an embodiment of an information write/read device relating to the present invention is described, with respect to an example of application thereof to a magnetic disk device.

Figure 1:
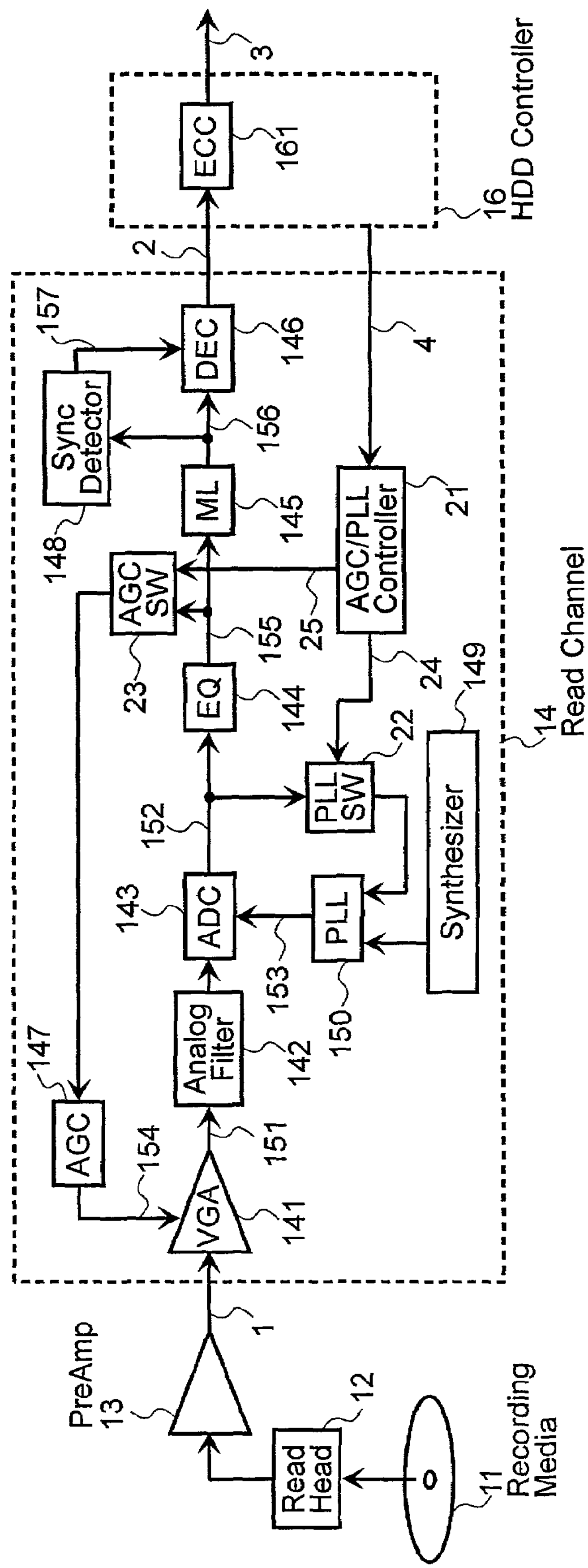
FIG. 1 is a diagram showing the composition of an information write/read device according to the present invention.
Figure 2:
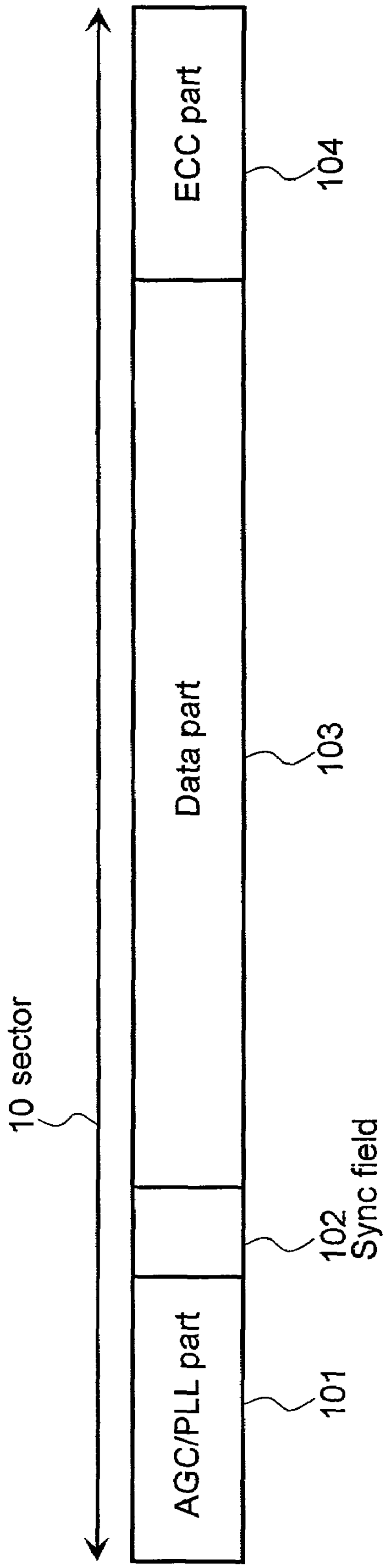
FIG. 2 is a diagram showing a conventional sector composition.
Figure 3:
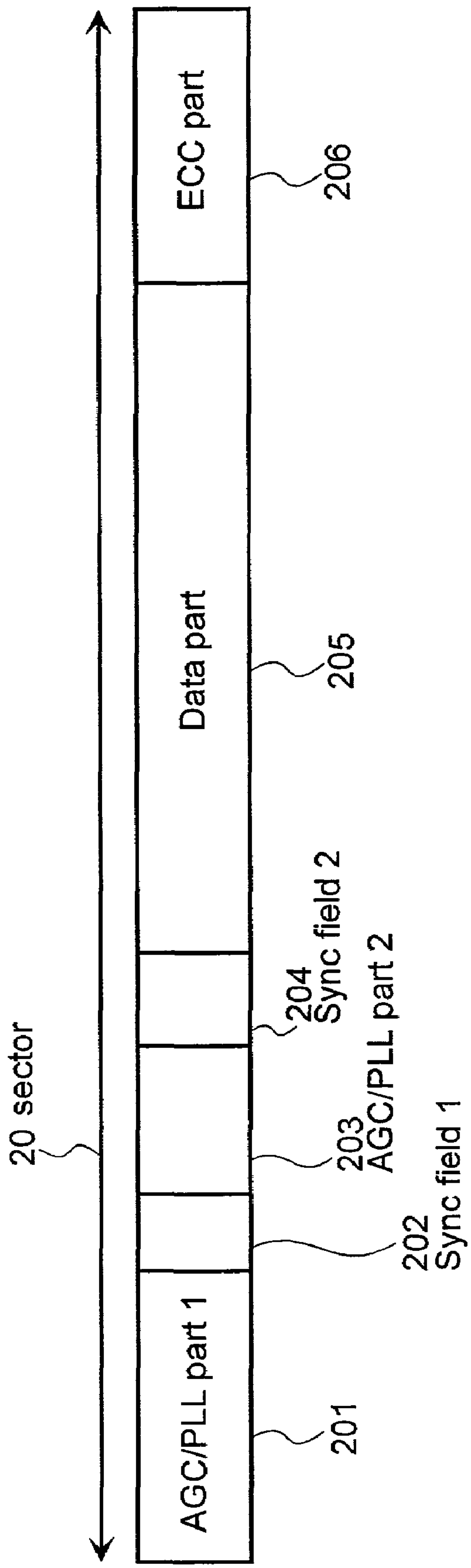
FIG. 3 is a diagram showing a conventional sector composition using multi-sync.

Firstly, the composition of the present embodiment is illustrated in FIG. 1.

Figure 4:
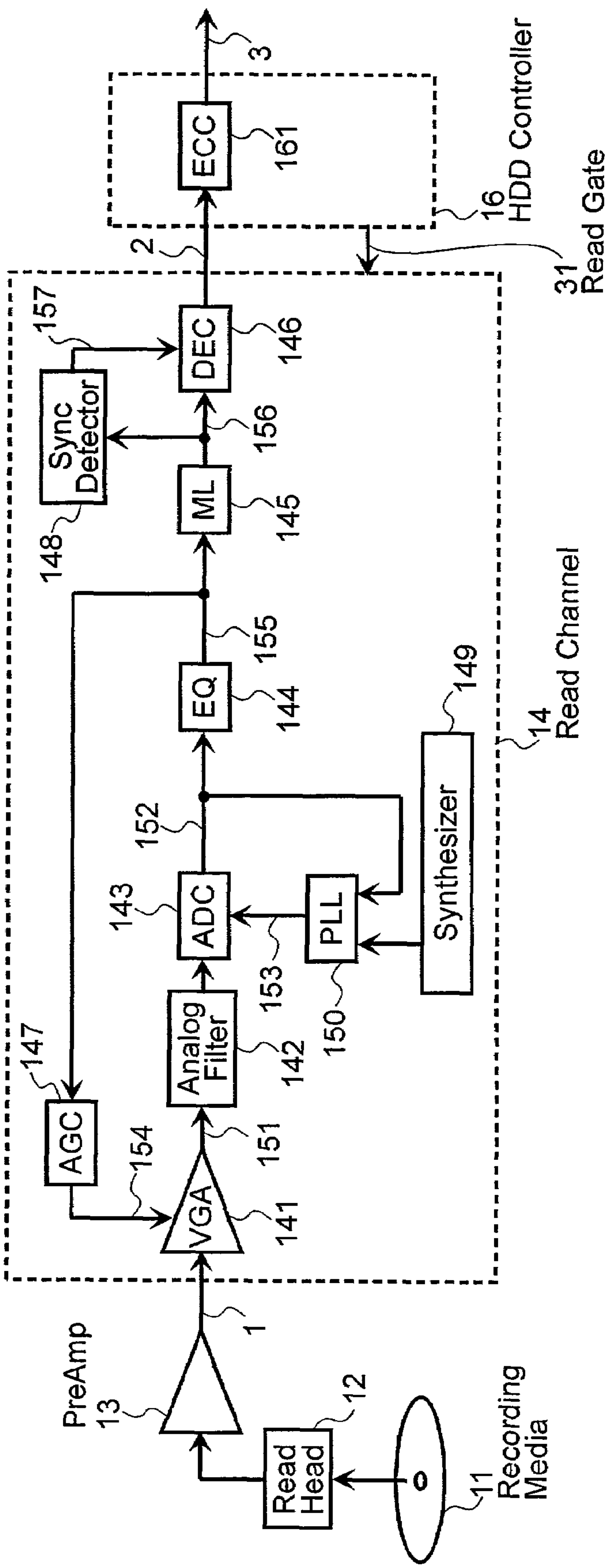
FIG. 4 is a diagram showing the composition of a conventional information write/read device.

In FIG. 1, a similar read procedure to that of the conventional method illustrated in FIG. 4 is used for a continuously written head sector, and hence further description thereof is omitted here. When reading continuous sectors, the Hard Disk Controller 16 outputs a control signal 4, and this signal is received by an AGC/PLL control signal generator 21, which outputs a PLL control signal 24 and an AGC control signal 25, and cuts off a PLL control switch 22 and AGC control switch 23. Thereby, at the AGC/PLL part of the following sector, no control is performed by the AGC (automatic gain control) circuit 147 or PLL circuit 150, and hence the AGC circuit 147 and PLL circuit 150 are held temporarily. When the Sync and data part 205 signals are input again, the switches 22, 23 are closed, and the AGC circuit 147 and PLL circuit 150 are operated.

Figure 5:
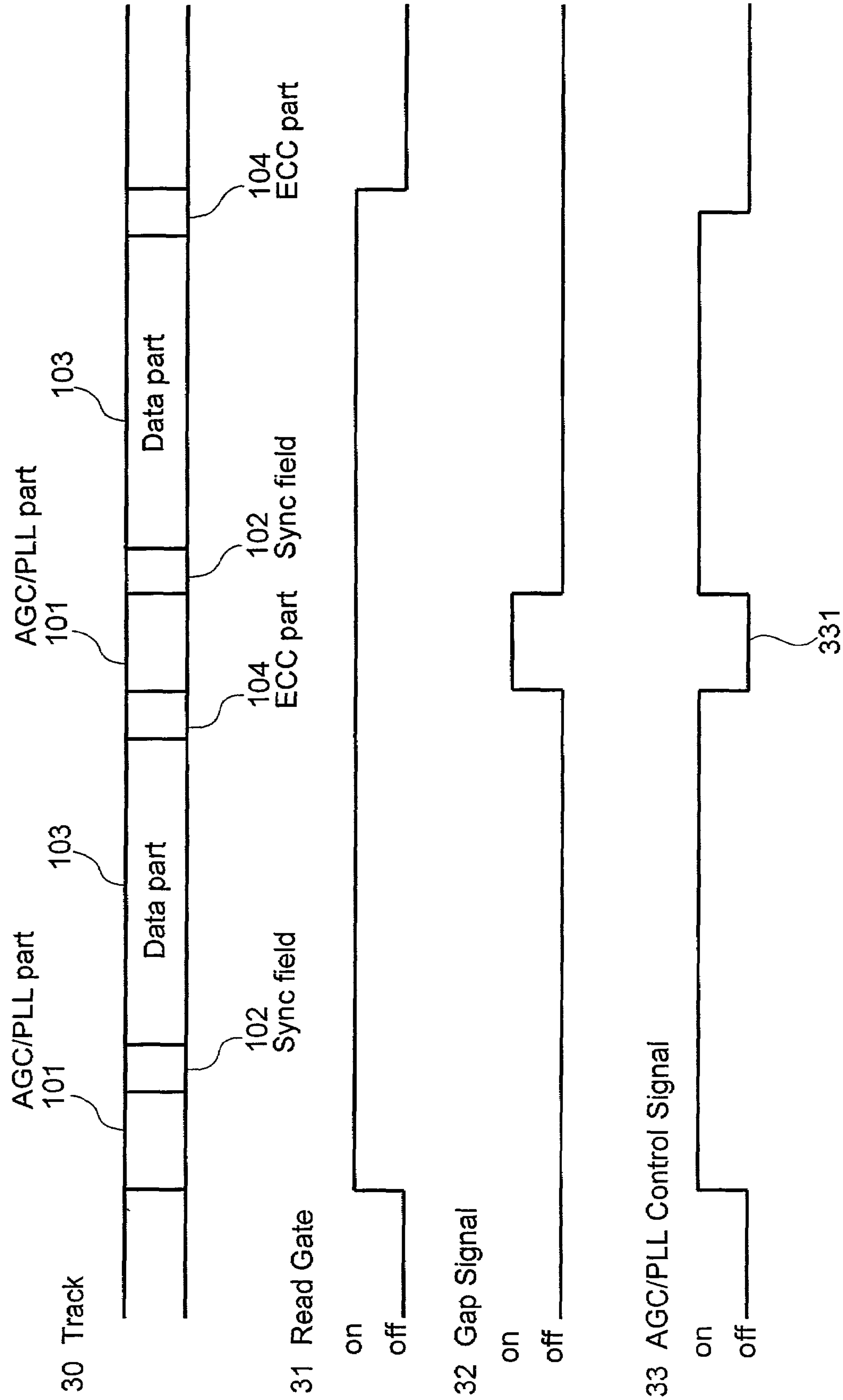
FIG. 5 is a control flow diagram using a Gap signal, relating to a first embodiment of the present invention.

A first embodiment of the invention is now described with reference to the control flow diagram in FIG. 5. In this case, the control signal 4 in FIG. 1 is taken to indicate two signals, the RG signal 31 and Gap signal 32, illustrated in FIG. 5.

In the continuously written track 30, at the head sector, the RG 32 is set to a read-enabled state, and the amplitude control and read clock signals are ensured by the AGC circuit 147 and the PLL circuit 150. Moreover, after detecting the Sync signal, the data part 103 is read. If reading has finished by the end of the head sector, then whilst the signal of the AGC/PLL part 101 is being read out by the device monitoring the following sector, a Gap signal 32 is issued, the AGC/PLL control signal 33 is halted (331) whilst the Gap signal is issued, and when it terminates, the Sync detector 148 is activated. During this, RG 31 remains set to a read-enabled state. When the AGC/PLL part has ended, data synchronization is performed by the data synchronization signal 157, and data reproduction is performed by inputting the signal read out from the data part to the decoder.

According to the present embodiment, even if an error occurs in the AGC/PLL part, since no read digital signal 152 or equalizer output signal 155 is input to the control of the AGC circuit 147 and PLL circuit 150, then the output amplitude control signal or read clock signal are fixed to the last value of the previous sector. Therefore, it is not affected by the error in the AGC/PLL part.

Figure 6:
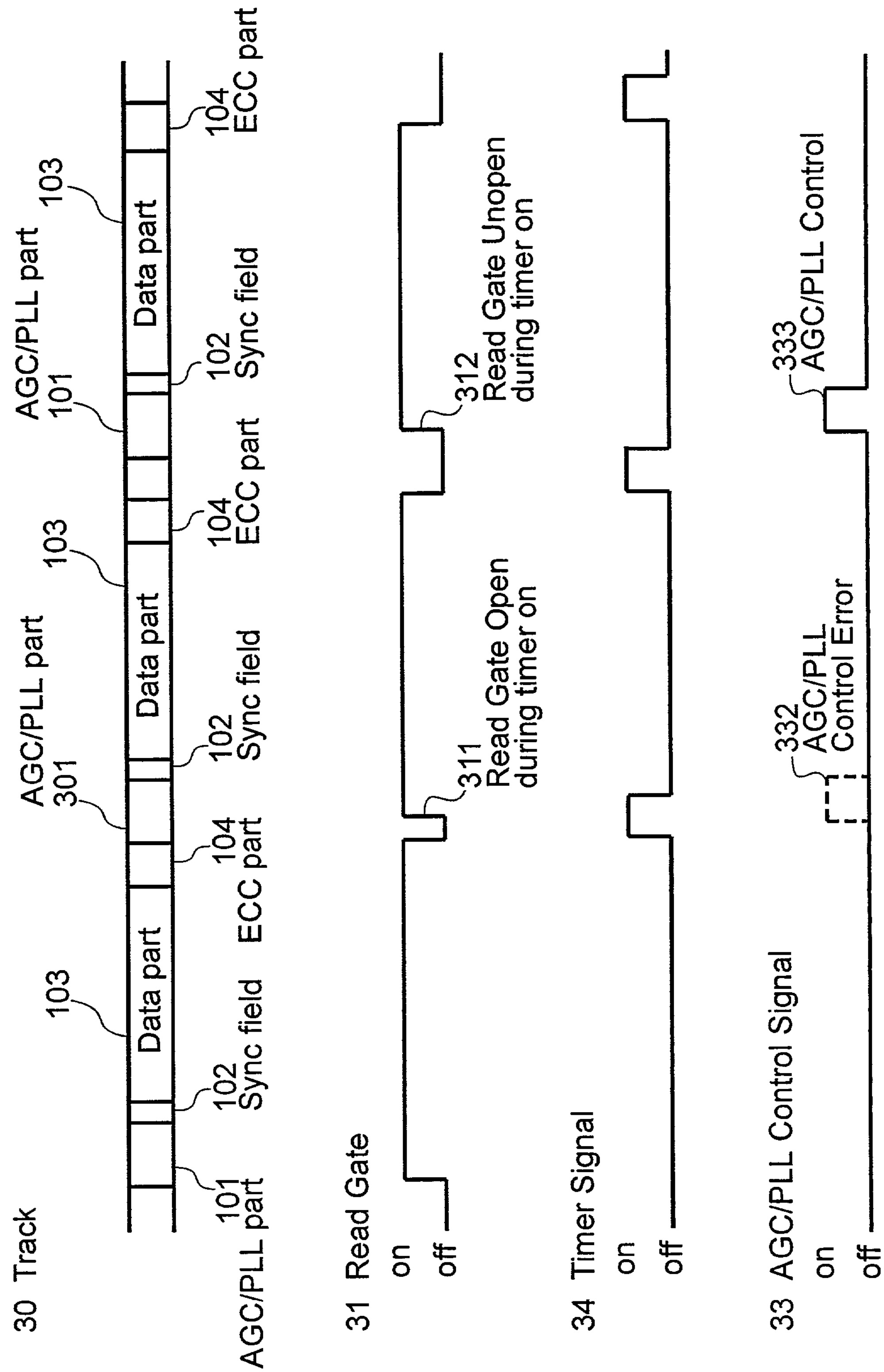
FIG. 6 is a control flow diagram using a timer signal 34 relating to a second embodiment of the present invention.

A second embodiment is described now with reference to the control flow diagram in FIG. 6. In this case, the control signal 4 in FIG. 1 is taken as the RG 31 in FIG. 6.

In the continuously written track 30, the head sector is read similarly to the prior art. At the end of the head sector, RG 31 is set to a read-prohibited state. At the same time, the timer 32 is started and if RG 31 is set back to a read-enabled state (311) within the time period of the timer, then the data reading of the following sector is performed using the output amplitude control signal or read clock signal from the end of the previous sector, without restarting the AGC circuit 147 and PLL circuit 150 (332). If RG 31 is still in a read-prohibited state when the timer period expires (312), then the AGC circuit 147 and PLL circuit 150 are started again (333), the AGC/PLL signals are extracted and data reading is performed.

According to the present embodiment, even if RG temporarily assumes a read-prohibited state, providing that this is within the period of the timer, then the AGC/PLL signals are not extracted and hence there will be no adverse effects even if an error occurs in the AGC/PLL part.

Figure 7:
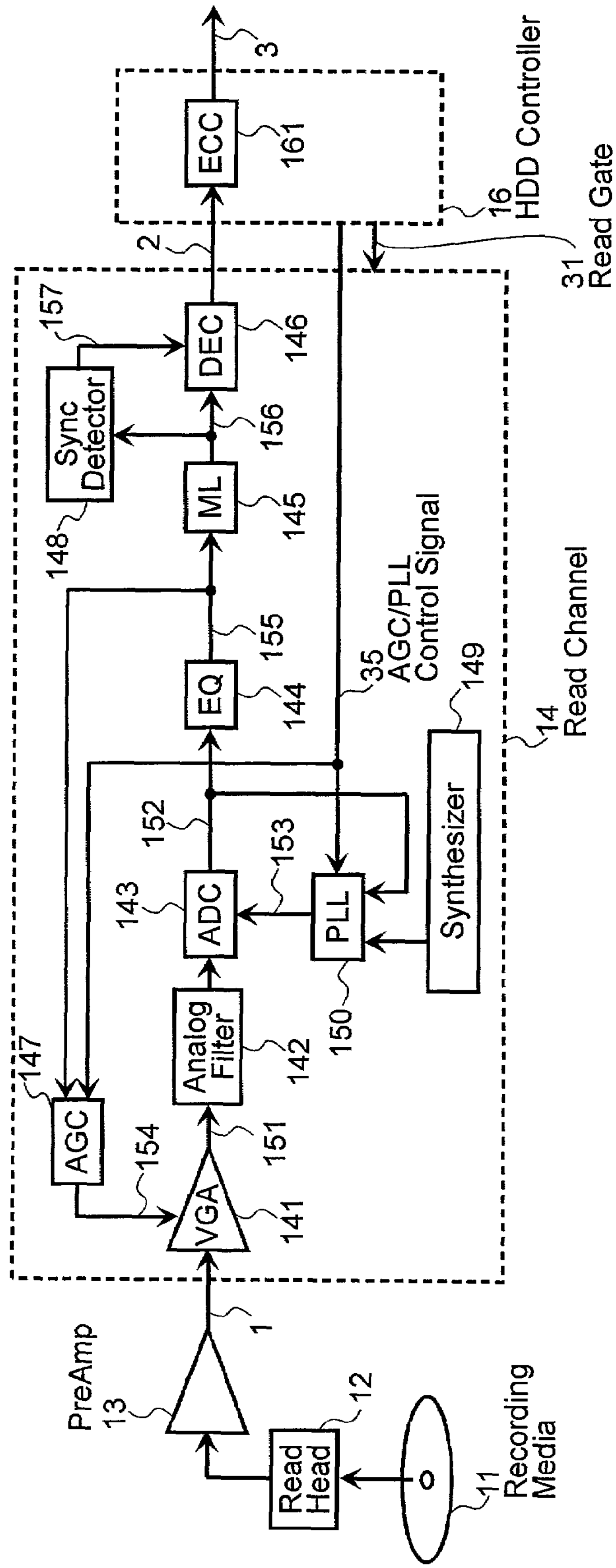
FIG. 7 is a diagram showing the composition of a device based on control by the hard disk controller relating to a third embodiment of the present invention.
Figure 8:
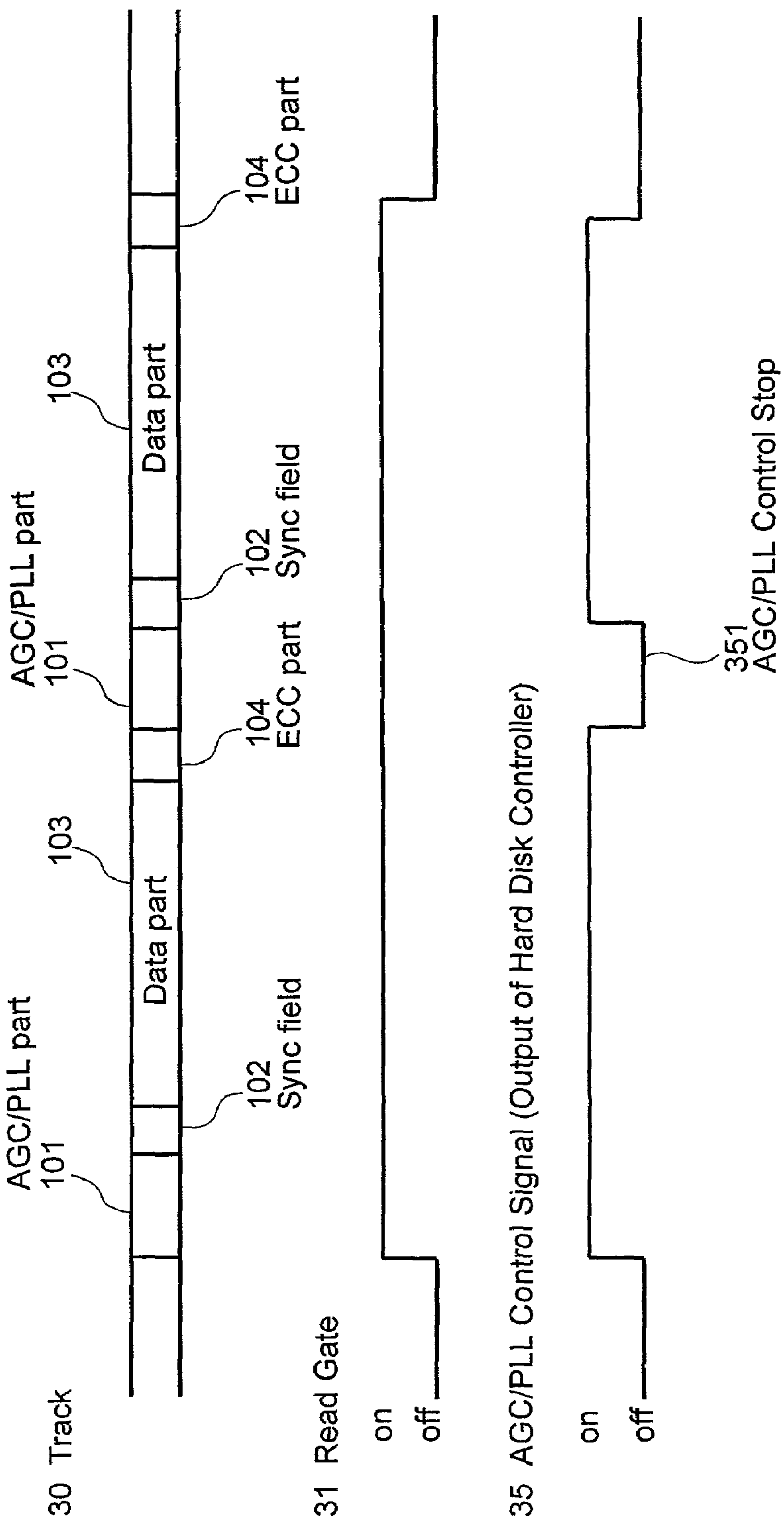
FIG. 8 is a control flow diagram for performing control by the Hard Disk Controller according to a third embodiment.

A third embodiment relating to a composition which does not use an AGC/PLL control signal generator 21 as illustrated in FIG. 1 is described now with reference to FIG. 7 and FIG. 8.

If no AGC/PLL control signal generator is used, then the Hard Disk Controller directly transmits an AGC/PLL control signal 35 (control signal output by Hard Disk Controller) which specifies the presence or absence of an operation for reproducing AGC/PLL control information. In the case of continuous reproduction, in the head sector, the Hard Disk Controller 16 issues an AGC/PLL control signal 35 simultaneously with setting RG 31 to a read-enabled state. Here, the AGC circuit 147 and PLL circuit 150 perform AGC/PLL control according to the signal written to the AGC/PLL part. In the AGC/PLL part in the second and following sectors, RG 31 remains in a read-enabled state, but the AGC/PLL control signal is halted (351). Consequently, AGC/PLL control is halted whilst RG 31 is maintained in a read-enabled state.

According to the present embodiment, since there is no AGC/PLL control signal generator 21 incorporated into the read channel 14, and the AGC circuit 147 and PLL circuit 150 are controlled by the Hard Disk Controller, there are no adverse effects even when an error occurs in the AGC/PLL part.

According to the first, second, and third embodiments described above, even if an error occurs in the AGC/PLL part, it is not necessary to adopt a countermeasure which involves lengthening the AGC/PLL part and shifting the data extraction region during retry, as in the prior art, and hence the AGC/PLL part can be shortened accordingly, thereby permitting format efficiency to be improved.

Figure 9:
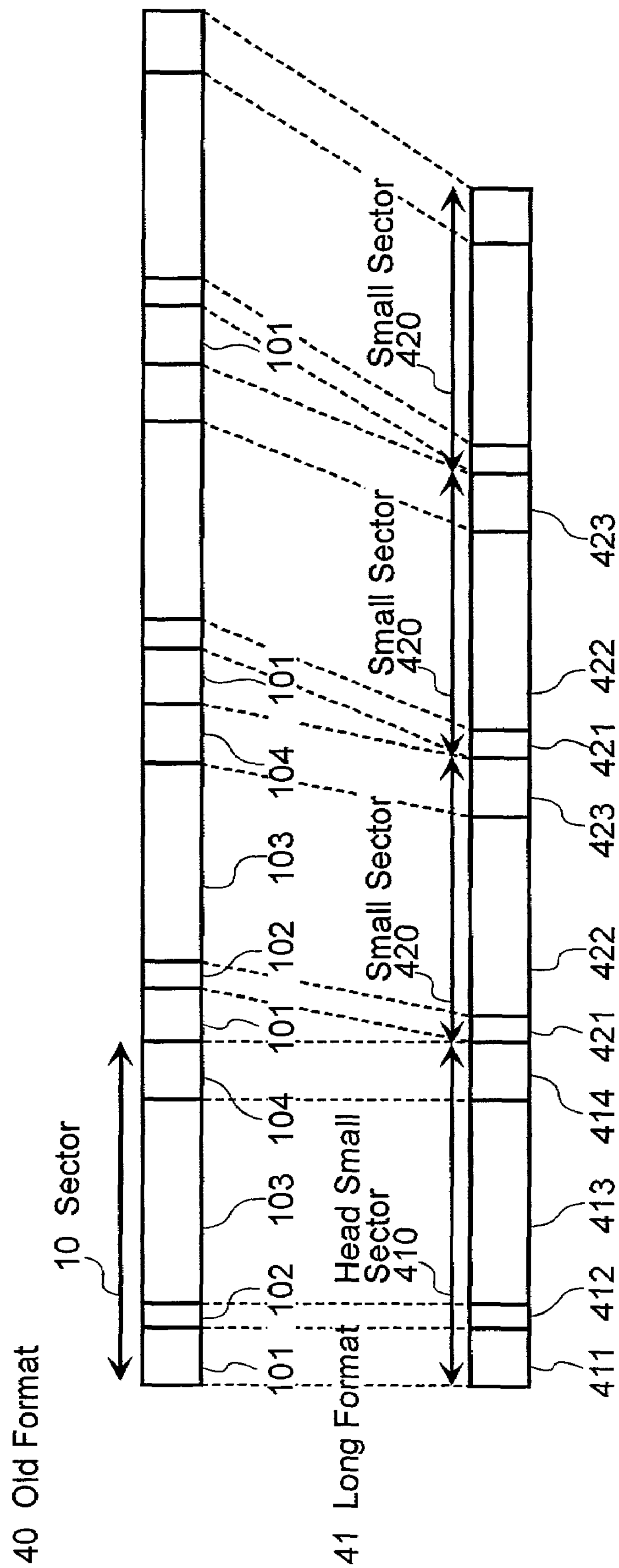
FIG. 9 is an illustrative diagram relating to a long format composition, according to a fourth embodiment.

FIG. 9 shows, as a fourth embodimen, a compositional example of a long format wherein the sector length is increased beyond that of a conventional format.

In the continuously written sector in the conventional format 40, an AGC/PLL signal 101 is required for each sector. According to the first to third embodiments of the present invention, since only the AGC/PLL signal in the head is used, a file written continuously during reproduction can be written in the long format 41 according to the present invention. The continuously written head small sector 410 is reproduced similarly to the conventional format, and it contains a head small sector AGC/PLL part 41, head small sector Sync field 412, head small sector data part 413 and head small sector ECC part 414. In the following small sector 420, since no AGC/PLL signal is used, the AGC/PLL part 101 is obsolete, and hence the sector length can be made shorter than that of the head small sector. The following small sector 420 comprises a small sector Sync field 421, a small sector data part 422, and a small sector ECC part 423. Furthermore, in the long format, the length of the Sync field 421, data part 422 and ECC part 423 in each small sector 420 can be determined as desired for each individual small sector, but taking the size of the circuitry into account, it is desirable to standardize the lengths of the data parts and ECC parts in the small sectors 420. It is also possible to remove the Sync field 421 from a small sector.

According to the present embodiments, it is possible to write data in a long format 41 wherein an AGC/PLL signal is not included during writing. Consequently, since the AGC/PLL part can be deleted, it is possible to improve format efficiency.

Figure 10:
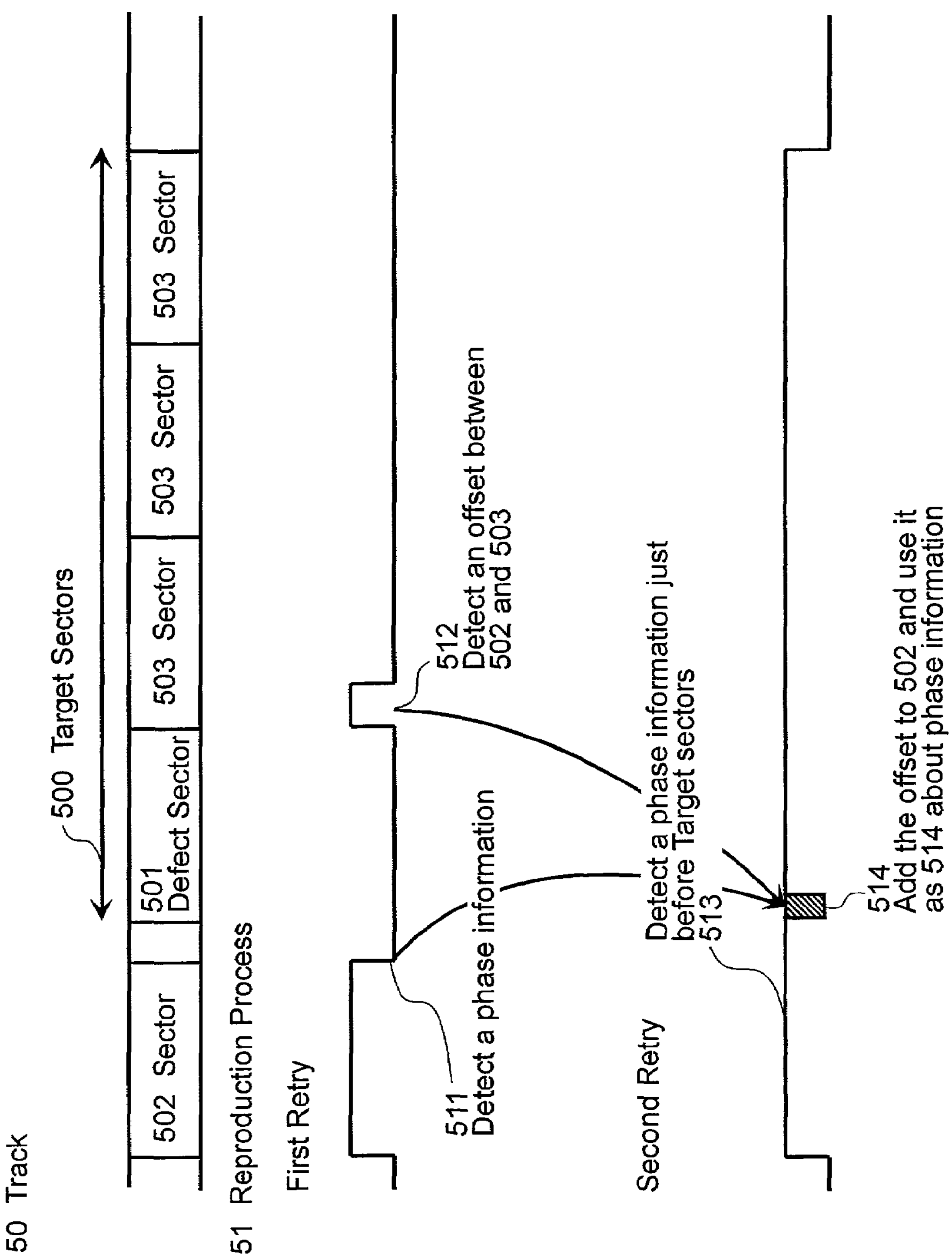
FIG. 10 is an illustrative diagram of a case where a defect occurs in a head sector, according to a fifth embodiment.

A fifth embodiment of the present invention relating to a case where a defect occurs in the AGC/PLL part of the head sector is described now with reference to FIG. 10. Numeral 50 is a track that is written and read continuously, and 51 is a reproduction process in the event of a retry.

If a defect occurs in the AGC/PLL part of the head sector 501 of a sector group (hereinafter, called target sectors) 500 that has been written continuously and is to be reproduced continuously, then it is not possible to use the AGC/PLL part of the head sector. In this case, a retry is performed. When performing a retry, the sector 502 immediately before the head sector 501 of the target sectors is read out. On the first retry, PLL information is gathered from the sector 502 immediately before the head sector 501 of the target sectors (511). PLL control is halted by the AGC/PLL part of the sector at the head of the target sectors, and the PLL control information of the immediately preceding sector 502 is held. Thereafter, at the AGC/PLL parts of the second and following sectors 503 of the target sectors, the PLL information of the sector 503 is referenced and the difference (offset) between that information and the held PLL control information of the immediately preceding sector 502 is determined (512). At the second retry, read out from the immediately preceding sector 502 is started (513), and when the AGC/PLL part of the head sector 501 to be read out , which contains a defect, is reached, read out is performed using PLL information for the target sectors 500 obtained by correcting the PLL information of the immediately preceding sector 502 with the offset obtained during the first retry. In the following sectors, data is reproduced by means of the continuous reading method of the present invention in accordance with the first to third embodiments.

According to the present embodiment, even if an error occurs in the head sector when reading out a continuously written group of sectors, it is possible to perform data reproduction by means of a limited number of retry operations. Moreover, similar beneficial effects can be expected if the offset employed at 514 by the PLL circuit 150 in FIG. 7 is set arbitrarily by the Hard Disk Controller 16.

Figure 11:
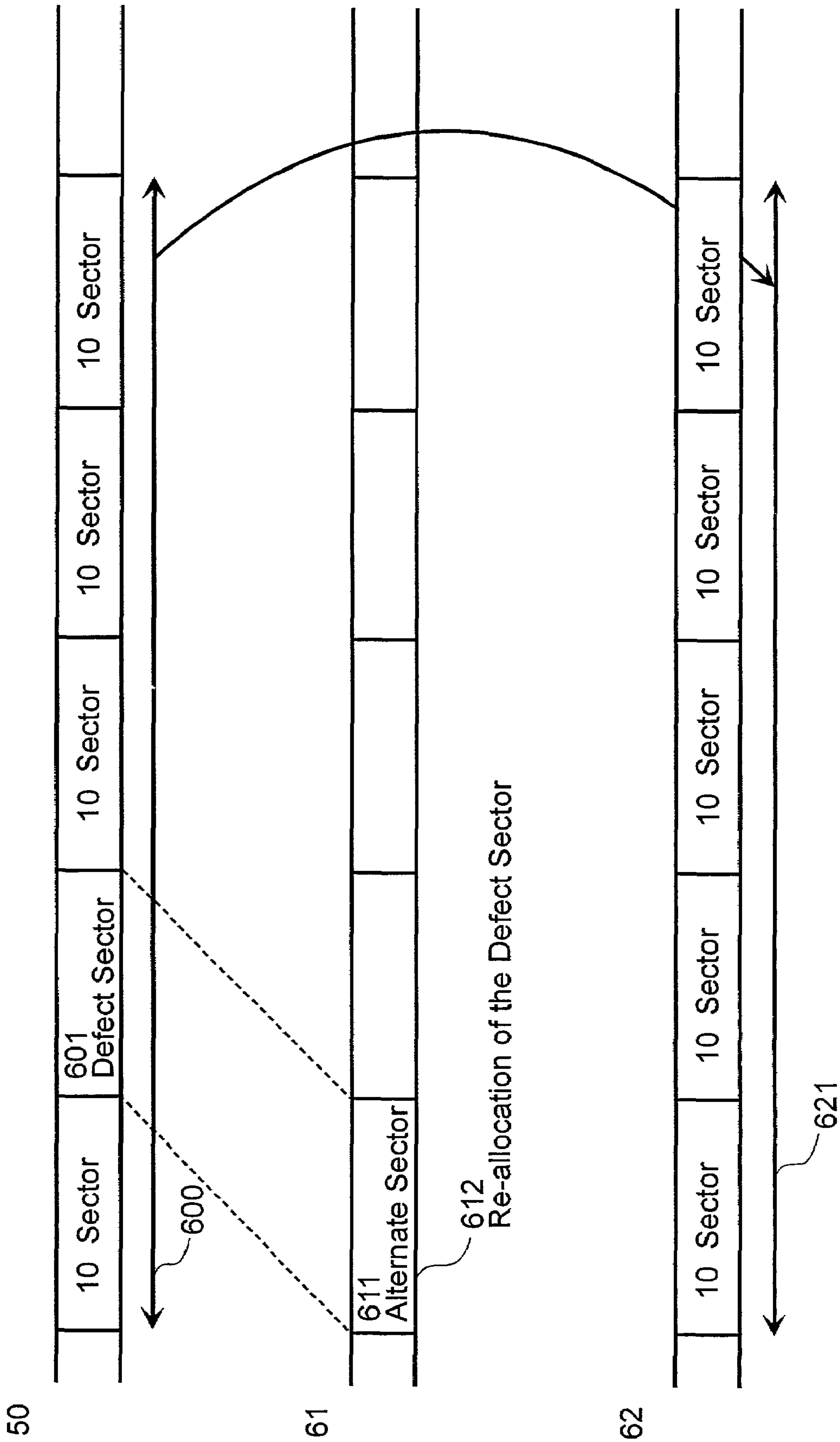
FIG. 11 is an illustrative diagram relating to sector reallocation due to a defect, according to a sixth embodiment of the present invention.

Now a sixth embodiment is described with reference to FIG. 11, wherein data in a sector is reallocated to an alternate sector due to a defect.

In a track 60 containing data that is written and read continuously, if it is necessary to reallocate the data in a sector 601 containing a defect, due to damaging of the media surface, or the like, to an alternate sector 611, then rather than writing only that sector 601 to a conventional alternate region 61 (612), all of the sector group 600 containing a series of data is written to the alternate region 62 according to the present invention (621). Here, firstly, the sectors 10 of the written track 60 apart from the defect sector are written with data matching the sector length of the continuously written data in each of the consecutive regions.

According to the present embodiment, even if a defect occurs in a part of a sector within the continuously written and read data, and an alternate sector is used, it is still possible to perform continuous write and read operations as in the first to third embodiments.

Figure 12:
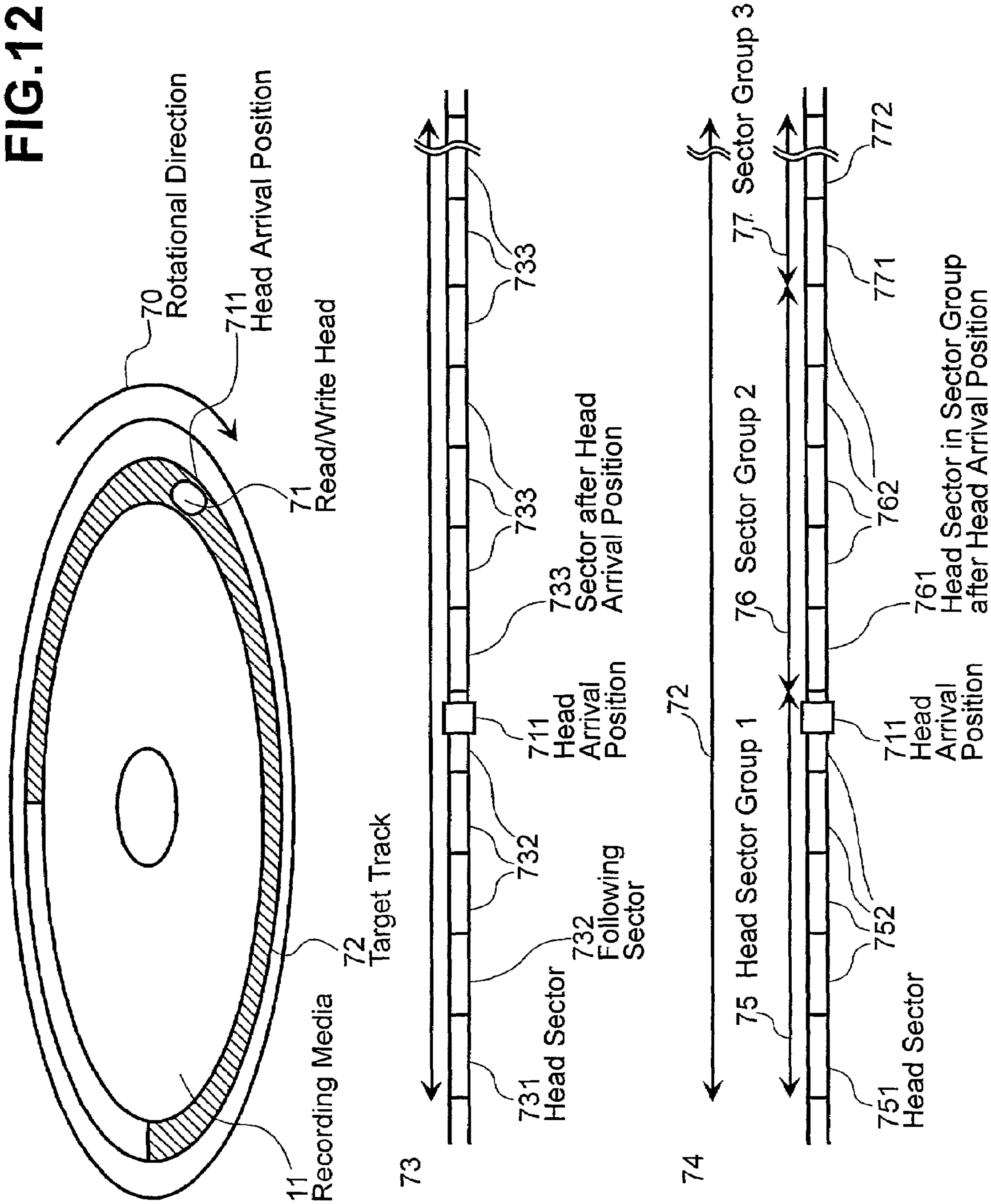
FIG. 12 is an illustrative diagram relating to a head arrival position and write/read start sector according to a seventh embodiment of the present invention.

A seventh embodiment is now described with reference to FIG. 12, relating to a case where the head positioning operation reaches a sector other than the head of the continuously written and read sectors. 73 is a bulk write read method, and 74 is a divided write read method.

The recording media 11 to be written and read is rotated in a rotational direction 70, and writing and reading is performed by a write/read head 71. If, in the operation for positioning the head at the region (target track) 72 that is to be written/read continuously on the recording media, the head arrives at a position 711 other than the head of the region (target track) 72 that is to be written/read continuously, then the sector 733 after the head arrival position 711 is not written or read, and no write/read operation is performed until the head reaches the head sector 731 of the region 72 that it to be written/read continuously. Incidentally, 732 denotes the sector following the region that is to be written/read continuously.

Alternatively, the continuously written and read region 72 is divided into sector groups 75–77 each comprising a set number of consecutive sectors, and a write/read operation is started at the instant that the head arrives at any one of the head sectors 751, 761, 771 of the respective sector groups 75–77 that are to be written/read continuously. According to the example in FIG. 12, a write/read operation is started at the head sector 761 of the first sector 76 after the head arrival position 711, whereupon sector group 77, and finally, sector group 75, are written/read. 752, 762 and 772 are following sectors in the head sector group.

According to the present embodiment, it is possible to continuously write/read data that is to be written/read continuously, either in its entirety, or in sector group units wherein several sector units are taken as a single object, and if writing/reading is performed in sector group units, then continuous writing/reading as described in the first to third embodiments can be performed, even if the head does not necessarily arrive at the head sector.

The present invention is not limited to the foregoing embodiments, and may of course be modified variously, provided that it does not depart from the essence of the invention.

For example, in the foregoing description, the output amplitude control signal or read clock signal were held by halting the input signals to the AGC circuit 147 and PLL circuit 150, but a composition may also be adopted wherein a Gap signal 32 is input directly to the AGC circuit 147 and PLL circuit 150, thereby causing the output amplitude control signal and read clock signal to be held.

Furthermore, in the foregoing, the present invention was described with reference to a magnetic writing device, but in addition to this, it may also be used in a signal processing circuit for information processing, an integrating circuit, an optical magnetic disk device, an optical disk device, a floppy disk device, and the like.

The present invention provides a method, a signal processing circuit, and an information write/read device, whereby, even if a TA or defect of a kind liable to cause increased retry operations or to obstruct reading of a data part occurs in an AGC/PLL part, data reading can be recovered by means of zero retry operations, or a minimum number of retry operations.

Moreover, a further beneficial effect of the present invention is that it provides an information write/read device wherein format efficiency is improved, by being able to shorten the AGC/PLL parts of following sectors, or remove the AGC/PLL parts of following sectors.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A data read method, comprising the step of:

when reading out data written to sectors on a disk medium, data in a read-out target sector and a following sector next to said data is read out using an output amplitude control information and a read clock control information of a sector read out previously time-wise to said read-out target sector.

2. The data read method according to claim 1, comprising the steps of:

opening a read gate; and halting read-out control for a portion of said following sector;

wherein said output amplitude control information and said read clock control information for said previously read sector is held.

3. A method for an information write/read device having a function for writing or reading a plurality of sectors in a continuous fashion, comprising the steps of:

when reading continuously written data, a timer is started upon termination of control of said read operation for a sector unit; and provided that a time period until said start of control of the read operation for a following sector unit is within a predetermined period of said timer, an output amplitude control information and a read clock control information of a preceding sector is held.

4. A method for an information write/read device having a function for writing or reading a plurality of sectors in a continuous fashion, comprising the step of:

when continuously written sector groups are read continuously, instead of using an output amplitude control information and a read clock control information pertaining to a head sector of respective sector group, data reading is performed using a control information immediately preceding said head sector and a control information of a following sector read continuously to said head sector.

5. A signal processing circuit, comprising:

a read control signal which does not close between sectors during a period of continuous reading of a plurality of sectors;

a signal which halts reading control corresponding to a head part of a following sector; and a function for holding an output amplitude control information and a read clock control information in response to said signal which halts reading control.

6. A signal processing circuit, comprising:

a function for starting a timer upon termination of control of a read operation of a sector unit; and a function for holding an output amplitude control information and an read clock control information of a preceding sector, provided that a time period until a start of control of said read operation for a following sector unit is within a predetermined period of said timer.

7. A signal processing circuit in an information write/read device having a function for writing or reading a plurality of sectors in a continuous fashion, the signal processing circuit comprising:

first function for reading continuously written sector groups continuously; and second function for reading data continuously when first function is activated, instead of using an output amplitude control information and a read clock control information pertaining to a head sector of respective sector group, using a control information immediately preceding said head sector and a control information of a following sector.

8. A signal processing circuit in an information write/read device having a function for writing or reading a plurality of sectors in a continuous fashion, the signal processing circuit comprising:

first function for reading continuously written sector groups continuously;

second function for reading data when first function is activated, instead of using an output amplitude control information and a read clock control information pertaining to a head sector of respective sector group;

third function for enabling arbitrarily an offset information between said control information immediately preceding said head sector and a control information of a follwing sector read continuously; and fouth function for sending said offset information to a read channel.

9. An information write/read device using any one of the methods according to claim 1 to 3, comprising:

a function for reading data spanning a plurality of sectors; and a function for reading data by temporarily halting reading control of a following sector.

10. An information write/read device using any one of the methods according to claim 1 to 3, comprising:

a function for writing data continuously spanning a plurality of sectors.

11. An information write/read device using any one of the methods according to claim 1 to 3, comprising:

first function for writing data continuously to a plurality of sectors; and second function for deleting at least a portion where a particular cyclical pattern has been written in a second or more sectors.

12. An information write/read device using any one of the methods according to claim 1 to 3, comprising:

first function for writing or reading data spanning a plurality of sectors; and second function for waiting for a head sector of whole said data or a head sector of a sector group consisting of several sectors, if a head has arrived at a sector other than said head sector, to arrive for writing or reading.

* * * * *